(12) United States Patent
Nakanishi et al.

(10) Patent No.: US 11,609,097 B2
(45) Date of Patent: Mar. 21, 2023

(54) INFORMATION PROCESSING APPARATUS, INFORMATION PROCESSING METHOD AND PROGRAM

(71) Applicant: TOYOTA JIDOSHA KABUSHIKI KAISHA, Toyota (JP)

(72) Inventors: Kazuhiko Nakanishi, Kariya (JP); Yuko Mizuno, Nagoya (JP); Masayuki Matsuda, Seto (JP); Satoshi Shimada, Chiryu (JP); Takuya Maekawa, Nisshin (JP); Yorichika Ishiyama, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 740 days.

(21) Appl. No.: 16/438,952

(22) Filed: Jun. 12, 2019

(65) Prior Publication Data

US 2020/0011679 A1 Jan. 9, 2020

(30) Foreign Application Priority Data

Jul. 5, 2018 (JP) .............................. JP2018-128282

(51) Int. Cl.
*G01Q 10/02* (2010.01)
*G01C 21/34* (2006.01)
*G06Q 10/02* (2012.01)
*G01C 21/36* (2006.01)

(52) U.S. Cl.
CPC ..... *G01C 21/3438* (2013.01); *G01C 21/3461* (2013.01); *G01C 21/3679* (2013.01); *G06Q 10/02* (2013.01)

(58) Field of Classification Search
CPC ............ G10C 21/3438; G10C 21/3461; G10C 21/3679; G07Q 10/02
See application file for complete search history.

(56) References Cited

U.S. PATENT DOCUMENTS

| | | | |
|---|---|---|---|
| 2010/0161392 A1 | 6/2010 | Ashby et al. | |
| 2013/0054281 A1* | 2/2013 | Thakkar | G06Q 50/30 705/5 |
| 2015/0248689 A1* | 9/2015 | Paul | G06Q 30/0222 705/14.23 |
| 2015/0310486 A1* | 10/2015 | Hayes | G06Q 30/0264 705/14.5 |
| 2015/0379544 A1* | 12/2015 | Matejka | G06F 16/955 705/14.16 |
| 2016/0012461 A1* | 1/2016 | Paul | G06Q 30/0207 705/5 |
| 2017/0134382 A1* | 5/2017 | Darnell | G06Q 10/02 |

(Continued)

FOREIGN PATENT DOCUMENTS

JP 2018-055538 A 4/2018

*Primary Examiner* — Truc M Do
(74) *Attorney, Agent, or Firm* — Oliff PLC

(57) ABSTRACT

An information processing apparatus comprises a controller configured to acquire sponsor information including information on a facility available as a getting-in place or getting-off place for ride sharing, information on a time period during which the facility is available as the getting-in place or getting-off place for ride sharing, and information on a privilege when the facility is used as the getting-in place or getting-off place for ride sharing; and provide the acquired sponsor information to a ride sharing coordinator.

12 Claims, 10 Drawing Sheets

(56) References Cited

U.S. PATENT DOCUMENTS

| | | | | |
|---|---|---|---|---|
| 2017/0169366 | A1* | 6/2017 | Klein | G06Q 10/047 |
| 2018/0315022 | A1* | 11/2018 | Yamamoto | G06Q 10/06311 |
| 2019/0228659 | A1* | 7/2019 | Papineau | G08G 1/04 |
| 2019/0287034 | A1* | 9/2019 | Mitsumaki | G06Q 50/30 |
| 2019/0340453 | A1* | 11/2019 | Papineau | G06K 9/00832 |
| 2020/0013136 | A1* | 1/2020 | Okabe | G06Q 10/063114 |
| 2020/0175633 | A1* | 6/2020 | Fujimoto | B60W 60/00253 |
| 2021/0174387 | A1* | 6/2021 | Papineau | G01S 19/51 |

* cited by examiner

| SPONSOR ID | FACILITY NAME | FACILITY LOCATION (ADDRESS) | AVAILABLE TIME PERIOD | AVAILABLE FRAME | PRIVILEGE CONTENTS |
|---|---|---|---|---|---|
| SI101 | CONVENIENCE STORE A | ···, NAGOYA-CITY, AICHI PREFECTURE | 9:00-11:30, 13:30-16:30 | 2 | ○○ OFFERED |
| SI102 | FAMILY RESTAURANT B | ···, NAGOYA-CITY, AICHI PREFECTURE | 14:00-17:00 | 3 | ○○ YEN |
| SI103 | DRUG STORE C | ···, NAGOYA-CITY, AICHI PREFECTURE | 18:00-23:00 | 3 | COUPON DISTRIBUTION |
| SI104 | CONVENIENCE STORE D | ···, NAGOYA-CITY, AICHI PREFECTURE | 0:00-24:00 | 1 | POINTS OFFERED |
| SI105 | AMUSEMENT E | ···, NAGOYA-CITY, AICHI PREFECTURE | ··· | 5 | DISCOUNT TICKET |
| SI106 | CAFE F | ···, NAGOYA-CITY, AICHI PREFECTURE | ··· | 1 | ○○ YEN |
| ··· | ··· | ··· | ··· | ··· | ··· |

FIG. 3

| SPONSOR ID | FACILITY NAME | FACILITY LOCATION (ADDRESS) | AVAILABLE TIME PERIOD | AVAILABLE FRAME | PRIVILEGE CONTENTS | CONDITION ON NUMBER OF FELLOW PASSENGERS (TWO OR MORE PEOPLE) |
|---|---|---|---|---|---|---|
| S1101 | CONVENIENCE STORE A | ..., NAGOYA-CITY, AICHI PREFECTURE | 9:00-11:30, 13:30-16:30 | 2 | 200 YEN | YES (TWO OR MORE PEOPLE) |
| S1102 | FAMILY RESTAURANT B | ..., NAGOYA-CITY, AICHI PREFECTURE | 14:00-17:00 | 3 | 500 YEN | NO |
| S1103 | DRUG STORE C | ..., NAGOYA-CITY, AICHI PREFECTURE | 10:00-20:00 | 5 | 500 YEN | YES (HALF PRICE FOR TWO OR LESS PEOPLE) |
| S1104 | CONVENIENCE STORE D | ..., NAGOYA-CITY, AICHI PREFECTURE | 0:00-24:00 | 1 | 50 YEN PER FELLOW PASSENGER | YES (50 YEN PER PERSON) |
| S1105 | AMUSEMENT E | ..., NAGOYA-CITY, AICHI PREFECTURE | ... | 9 | 200 YEN | NO |
| S1106 | CAFE F | ..., NAGOYA-CITY, AICHI PREFECTURE | ... | 1 | 400 YEN | YES (FOUR OR MORE PEOPLE) |
| ... | ... | ... | ... | ... | ... | ... |

FIG. 7

INFORMATION PROCESSING APPARATUS, INFORMATION PROCESSING METHOD AND PROGRAM

CROSS REFERENCE TO THE RELATED APPLICATION

This application claims the benefit of Japanese Patent Application No. 2018-128282, filed on Jul. 5, 2018, which is hereby incorporated by reference herein in its entirety.

BACKGROUND

Technical Field

The present invention relates to an information processing apparatus, an information processing method and a program.

Description of the Related Art

A movement mode, called "ride sharing" in which a plurality of users share the same vehicle, is becoming widespread in recent years. Regarding such a movement mode, a technique is known in which a driver determines whether or not to admit riding of ride-share candidates so as to lower the driver's psychological hurdle to ride sharing (e.g., see Patent literature 1).

[Patent literature 1] Japanese Patent Laid-Open No. 2018-55538

SUMMARY

If there is some sort of incentive in implementing ride sharing, such an incentive may be considered to further stimulate implementation for ride sharing. It is an object of the present invention to provide a technique for motivating the driver to provide ride sharing and enhancing the driver's motivation.

The present invention in its one aspect provides an information processing apparatus comprising a controller configured to acquire sponsor information including information on a facility available as a getting-in place or getting-off place for ride sharing, information on a time period during which the facility is available as the getting-in place or getting-off place for ride sharing, and information on a privilege when the facility is used as the getting-in place or getting-off place for ride sharing; and provide the acquired sponsor information to a ride sharing coordinator.

The present invention in its another aspect provides an information processing method comprising a first step of acquiring sponsor information including information on a facility available as a getting-in place or getting-off place for ride sharing, information on a time period during which the facility is available as the getting-in place or getting-off place for ride sharing and information on a privilege when the facility is used as the getting-in place or getting-off place for ride sharing; and a second step of providing the sponsor information acquired in the first step to a ride sharing coordinator.

A third aspect of the present invention is a program for causing a computer to execute the above-described information processing method according to the second aspect or a computer readable storage medium that stores the program in a non-transitory manner.

According to the present invention, it is possible to motivate the driver to provide ride sharing and enhance the driver's motivation.

BRIEF DESCRIPTION OF THE DRAWINGS

FIG. 3 is a diagram illustrating an example of a table configuration of sponsor information according to the first embodiment;

FIG. 7 is a diagram illustrating art example of a table configuration of sponsor information according to the second embodiment;

DESCRIPTION OF THE EMBODIMENTS

Figure 1:
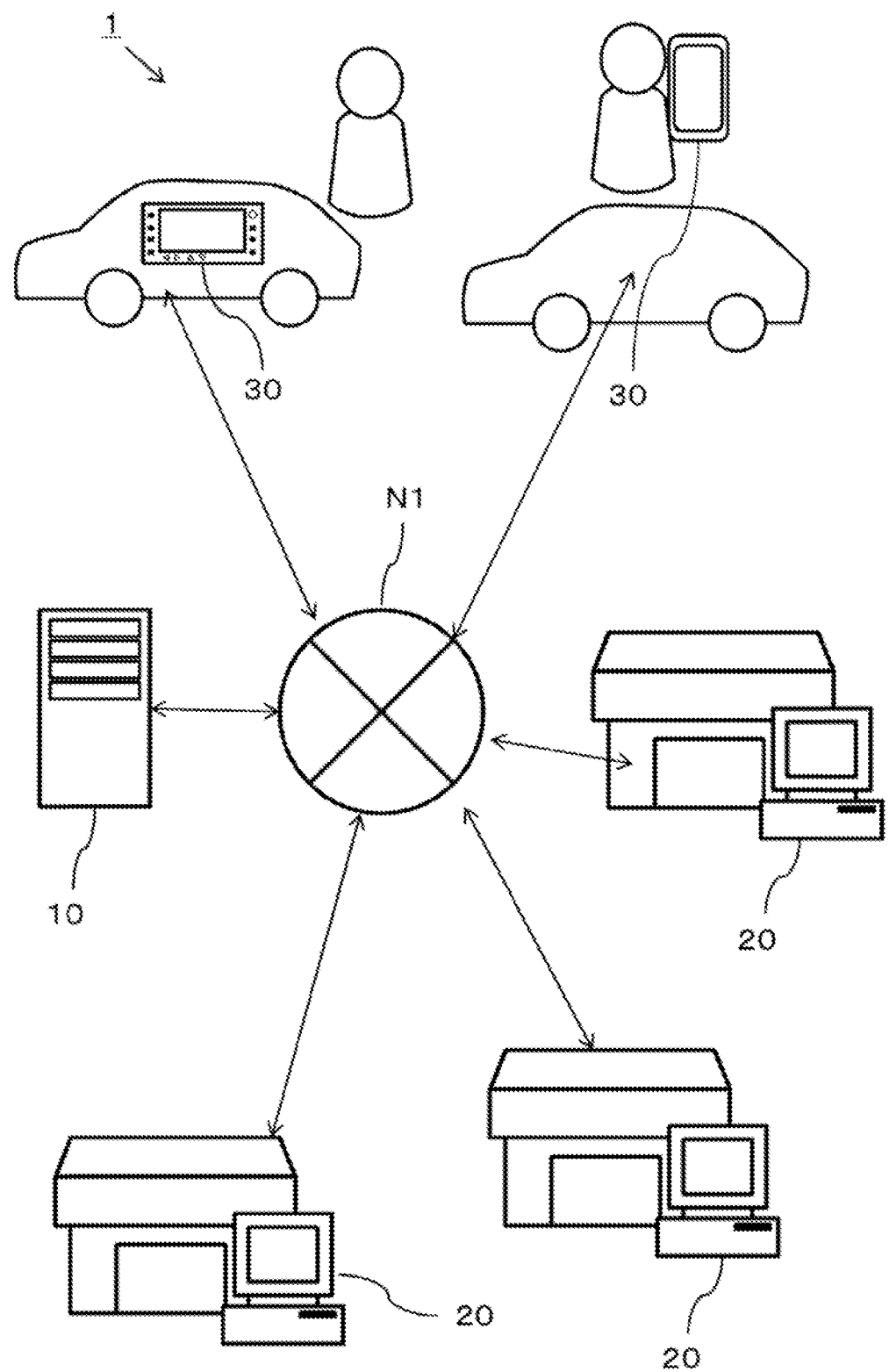
FIG. 1 is a schematic view of a ride sharing support system.

An information processing apparatus, according to a first aspect of the present invention is provided with a controller configured to: acquire sponsor information including information on a facility available as getting-in place or getting-off place (hereinafter also referred to as a "getting-in/off place") for ride sharing, information on a time period during which the facility is available as the getting-in place or getting-off place for ride sharing and information on a privilege when the facility is used as the getting-in place or getting-off place for ride sharing; and provide the acquired sponsor information to a ride sharing coordinator.

Note that the "ride sharing" referred to here means sharing of an automobile and is established when there are a driver and one or more fellow passengers. The getting-in place for ride sharing is not limited to a place of departure of the driver, but also refers to a place where a fellow passenger is picked up. This includes a case where all the fellow passengers are picked up and a case where only some fellow passengers are picked up. On the other hand, the getting-off place for ride sharing is not limited to a destination of the driver, but also refers to a place where a fellow passenger gets off. This also includes a case where all the fellow passengers get off and a case where only some fellow passengers get off.

Examples of the "facility information" described above include a facility name, a facility location, goods handled in the facility, a service provided by the facility, a number of spaces available as a getting-in/off place for ride sharing (hereinafter also referred to as a "parking frame"), Contents of the "privilege" described above are not limited but may include payment of money, point granting, issuance of a coupon, offering of goods, provision of a service or the like. Note that the information on a parking frame may be information on the total number of parking frames that can be provided by the facility or may be information on a "vacant parking frame" available at a predetermined point in time or information including all above.

The "ride sharing coordinator" described above does not simply refer to a provider of his/her own vehicle but also refers to a person who plans to implement ride sharing, looks for fellow passengers or responds to requests from the fellow passengers. The driver of the vehicle for ride sharing generally corresponds to such a coordinator, but the coordinator is not limited to the driver alone. The coordinator may be a fellow passenger such as the driver's wife who rides in the same vehicle and who does not drive but plays the role of looking for other fellow passengers. Alternatively, the coordinator may be a person who does not actually ride in the vehicle for ride sharing but serves as a mediator between the driver and ride-share candidates. That is, the "ride sharing coordinator" need not always be an owner of the vehicle or the driver himself/herself.

The above-described information processing apparatus makes it possible to perform matching between a person who manages a facility having a parking frame and who is intended to grant privileges to those who get in or get off the vehicle for ride sharing within the parking frame (hereinafter also referred to as a "sponsor") and the driver who desires an incentive for implementation for ride sharing. More specifically, this information processing apparatus can receive from the sponsor, facility-related information and information on a privilege when the facility is used as a getting-in/off place for ride sharing and provide the information at the request of the driver (or a coordinator who coordinates the ride sharing on behalf of the driver).

Note that in the present specification, "matching" is used to imply mediating between a supplier and a demander, and a target of supply and demand is a privilege (that is, an incentive for the driver). The "matching" can also be interpreted as matching a demander and a supplier who meets requirement's of the demander. The getting-in/off place for ride sharing can also be considered as a target of supply and demand.

The above-described system allows the sponsor not only to advertise the existence of the facility but also to attract a prospective customer (that is, ride sharing user) to the facility in exchange for offering of a parking frame and a privilege when ride sharing actually takes place. On the other hand, when implementing ride sharing, the driver can secure the parking frame of the facility as a getting-in/off place for ride sharing and also acquire a privilege provided by the facility. This constitutes not just an incentive to use the facility as the getting-in/off place for ride sharing but also an incentive for implementation for ride sharing itself.

Hereinafter, specific embodiments of the present-invention will be described based on the accompanying drawings. Dimensions, materials, shapes, relative arrangements or the like of components described in the present embodiments are not intended to limit the technical scope of the invention unless otherwise specified.

First Embodiment

System Overview

An overview of a ride sharing support system 1 according to a first embodiment will be described with reference to FIG. 1, Hereinafter, the ride sharing support system 1 will be simply referred to as a "system." The system according to the present embodiment is a system for supporting ride sharing constructed by including a server apparatus 10, a facility terminal 20 and a vehicle terminal 30. Note that there are at least as many facility terminals 20 as the number of facilities using the present system. Furthermore, there are at least as many vehicle terminals 30 as the number of vehicles using the present system.

In the ride sharing support system 1, the server apparatus 10, each facility terminal 20 and each vehicle terminal 30 are interconnected via a network N1. WAN (Wide Area Network) which is a worldwide public communication network such as the Internet and other communication networks may be adopted as the network N1. The network N1 may also include a telephone communication network for mobile phones or the like and a wireless communication network such as Wi-Fi.

The server apparatus 10 is an apparatus that communicates with one or more facility terminals 20 and one or more vehicle terminals 30 via the network N1 and performs predetermined information processing. The server apparatus 10 acquires facility-related information (hereinafter referred to as "sponsor information") having a parking frame available for use in ride sharing from the facility terminal 20 through communication. The server apparatus 10 also acquires information on a request from the driver (hereinafter also referred to as "request information") such as getting-in/off place for ride sharing, time at which getting-in/off for ride sharing is scheduled to take place from the vehicle terminal 30. The server apparatus 10 has a function of mediating the acquired information between the facility terminal 20 and the vehicle terminal 30. Note that the request information may also include information on privileges, information on fellow passengers for ride sharing or the like. The request information may also include user identification information for identifying a driver and/or vehicle. Note that in the present embodiment, the server apparatus 10 corresponds to the "information processing apparatus" according to the first aspect of the present invention.

The facility terminal 20 is a terminal apparatus that arranges a space available as a getting-in/off place for ride sharing and owned by a facility in the facility that expects to provide the space for ride sharing.

The vehicle terminal 30 is a terminal apparatus managed by the driver who implements ride sharing, and may foe a vehicle-mounted device mounted on the vehicle available for ride sharing or a portable information terminal such as a smartphone owned by the driver, for example. Note that in the present and subsequent embodiments, the driver corresponds to the "ride sharing coordinator" according to the first aspect of the present invention.

System Configuration

Figure 2:
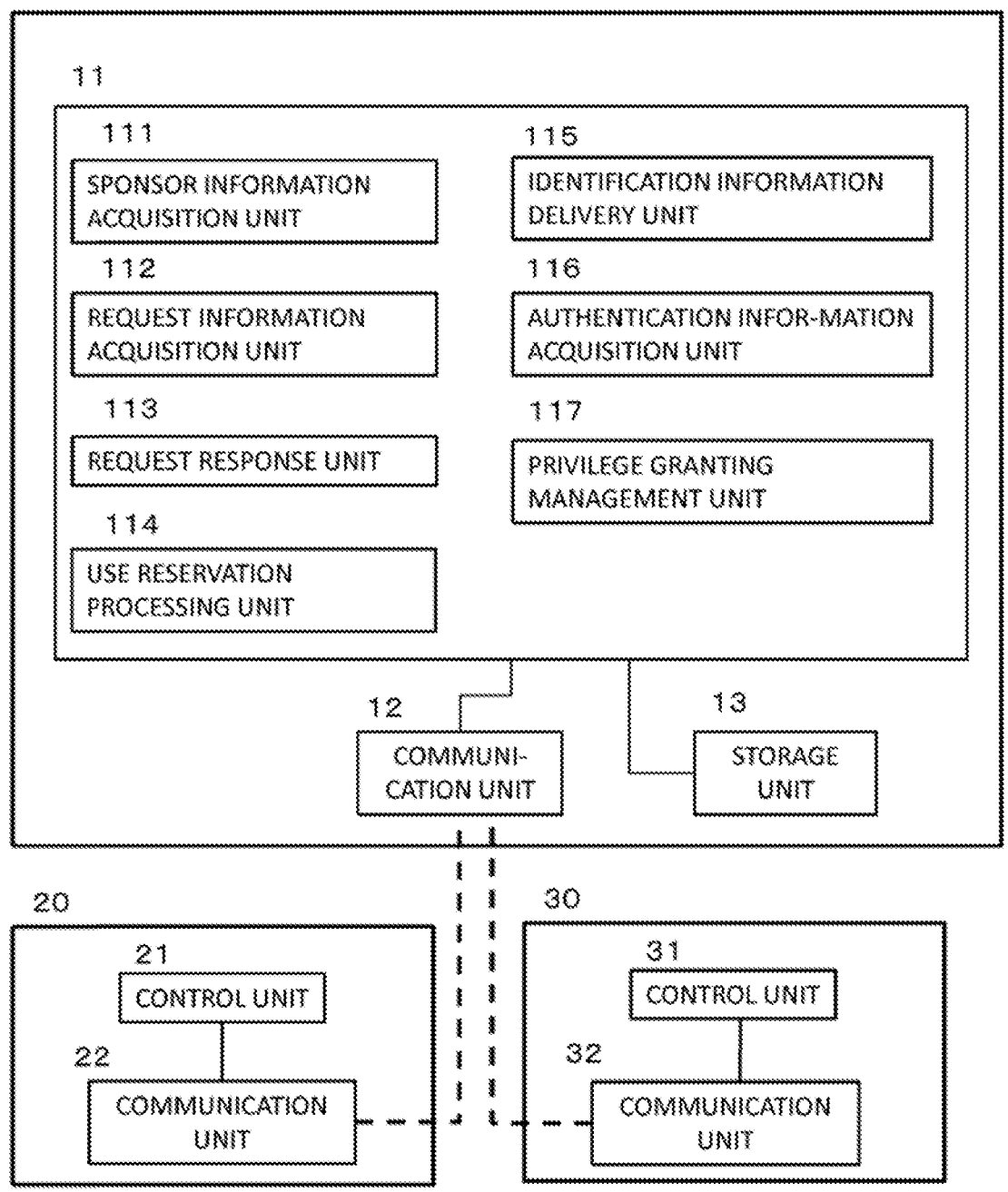
FIG. 2 is a block diagram schematically illustrating a configuration example of a ride sharing support system of a first embodiment.

Hereinafter, components of the system will be described in detail. FIG. 2 is a block diagram schematically illustrating a configuration example of the server apparatus 10, the facility terminal 20 and the vehicle terminal 30 illustrated in FIG. 1.

Server Apparatus

The server apparatus 10 is constructed of a general computer. That is, the server apparatus 10 is a computer provided with a processor such as a CPU or DSP, a read-only memory (ROM), a main memory such as a random access memory (RAM), and auxiliary memory such as an EPROM, a hard disk drive (HDD) or a removable medium. Note that the removable medium is, for example, a flash memory such as a USB memory or an SD card, or a disk recording medium such as a CD-ROM, a DVD disk or a blue ray disk. An operating system (OS), various programs, various tables or the like are stored in the auxiliary memory, and it is possible to implement various functional units that achieve a predetermined objective as will be described later by loading a program stored therein into a work area of the main memory and executing the program, and controlling the respective components through execution of the program. However, some or all of the functional units may be implemented by a hardware circuit such as an ASIC or FPGA. Note that the server apparatus 10 may be constructed of a single computer or constructed of a plurality of computers cooperating with one another.

The server apparatus 10 is constructed toy including a control unit 11, a communication unit 12 and a storage unit 13. The control unit 11 is means for controlling the server apparatus 10, and is constructed of a CPU or the like. The control unit 11 includes a sponsor information acquisition unit 111, a request information acquisition unit 112, a request response unit 113, a use reservation processing unit 114, an identification information delivery unit 115, an authentication information acquisition unit 116 and a privilege granting management unit 117 as functional modules. The respective functional modules may also be implemented by the CPU executing the program stored in the storage means such as the ROM.

The communication unit 12 is communication means for connecting the server apparatus 10 to the network N1. The communication unit 12 is constructed by including, for example, a LAN (Local Area Network) interface board and a wireless communication circuit for wireless communication.

The storage unit 13 includes a database (DB) storing sponsor information received from each facility terminal 20. The database is constructed by the program of a database management system (DBMS) which is executed by the processor managing data stored in the auxiliary memory.

Next, each functional module provided in the control unit 11 will be described. The sponsor information acquisition unit 111 acquires sponsor information from the facility terminal 20 via the communication unit 12 and stores the sponsor information in the storage unit 13. The sponsor information includes information relating to the facility in which the facility terminal 20 is disposed, information relating to a time period during which the parking frame of the facility is available as the getting-in/off place for ride sharing and information relating to a privilege when the parking frame provided in the facility is used as the getting-in/off place for ride sharing.

Note that in the present embodiment, "sponsor information," "information relating to the facility in which the facility terminal 20 is disposed," "information relating to the time period during which the parking frame of the facility is available as the getting-in/off place for ride sharing" and "information relating to a privilege when the parking frame provided in the facility is used as the getting-in/off place for ride sharing" correspond to the "sponsor information," the "information on the facility available as the getting-in place or getting-off place for ride sharing," the "information on the time period during which the facility is available as the getting-in place or getting-off place for ride sharing" and the "information on a privilege when the facility is used as the getting-in place or getting-off place for ride sharing" according to the first aspect of the present invention respectively.

The sponsor information is stored in the storage unit 13 as a DB in a table format, for example. FIG. 3 illustrates an example of a table configuration of sponsor information. As illustrated in FIG. 3, the table configuration may include a sponsor ID field, a facility name field, a facility location field, an available time period field, a parking frame field, a privilege contents field or the like. Here, the information stored in the parking frame field may be information on the total number of parking frames that can be provided by the facility, information on a "vacant parking frame" available at a current point in time or information including both. FIG. 3 illustrates an example where information on the "vacant parking frame" is stored.

The request information acquisition unit 112 acquires request information from the vehicle terminal 30 via the communication unit 12. The request information includes information on a place where the driver having the vehicle terminal 30 is scheduled to allow a fellow passenger to get in or get off the vehicle and information on a time period during which the vehicle terminal 30 is scheduled to allow a fellow passenger to get in or get off the vehicle. Note that the place scheduled for the fellow passenger to get in or get off the vehicle need not be a specific address, and the place may be a name of a region, a name of a station of public transportation (bus stop name) or the like.

The request response unit 113 extracts one or more pieces of sponsor information (hereinafter also referred to as "matching sponsor information") that matches conditions of the request information acquired by the request information acquisition unit 112 from the storage unit 13. Furthermore, the request, response unit 113 transmits the matching sponsor information to the vehicle terminal 30 via the communication unit 12 (that is, provides the sponsor information to the driver). Thus, the driver who has received the matching sponsor information can reserve use of a desired facility from the facility associated with the matching sponsor information. Note that the "sponsor information that matches the conditions of the request information" includes not only information that completely satisfies the conditions but also information with a high degree of matching.

The use reservation processing unit 114 receives a reservation for use of the facility from the driver who has received provision of the matching sponsor information. As a specific processing example, the use reservation processing unit 114 performs a process of reducing the value of the parking frame field of the facility, use of which has been reserved on the table of sponsor information stored in the storage unit 13. The use reservation processing unit 114 transmits use reservation information including a use scheduled time to the facility terminal 20 of the facility, use of which has been reserved via the communication unit 12.

The identification information delivery unit 115 creates identification information for the reservation for use received by the use reservation processing unit 114 and transmits the identification information to the vehicle terminal 30 via the communication unit 12. Note that the identification information is used for authentication when the facility is actually used as the getting-in/off place for ride sharing.

The authentication information acquisition unit 116 acquires authentication information indicating that the facility, use of which has been reserved as the getting-in/off place for ride sharing has actually been used based on the reservation. Note that in the present embodiment, authentication is performed using the identification information delivered by the identification information delivery unit 115 and the authentication information is transmitted from the facility terminal 20.

The privilege granting management unit 117 performs a process for granting a privilege to the driver based on the authentication information acquired by the authentication information acquisition unit 116. For example, the privilege granting management unit 117 performs a process so as to directly make remittance, grant points, issue a coupon, deliver goods or the like to the driver via the communication unit 12 and another system.

Facility Terminal

The facility terminal 20 is provided with a control unit 21 and a communication unit 22, and various input/output units. The control unit 21 is means for controlling the facility terminal 20, and is constructed of a CPU or the like. The communication unit 22 is communication means for connecting the facility terminal 20 to the network N1. The facility terminal 20 is a computer such as a general-purpose personal computer, a smartphone, a tablet computer, a mobile computer, a wearable computer, a wireless storage, a mobile phone or a handy terminal.

Vehicle Terminal

The vehicle terminal 30 is provided with a control unit 31 and a communication unit 32, and various input/output units. The control unit 31 is means for controlling the vehicle terminal 30 and is constructed of a CPU or the like. The communication unit 32 is communication means for connecting the vehicle terminal 30 to the network N1. The vehicle terminal 30 is not limited to a vehicle-mounted device mounted on the vehicle, but may also be a general-purpose information terminal such as a smartphone, a tablet computer, a mobile computer, a mobile phone or a handy terminal owned by the driver.

Processing Flow

Figure 4:
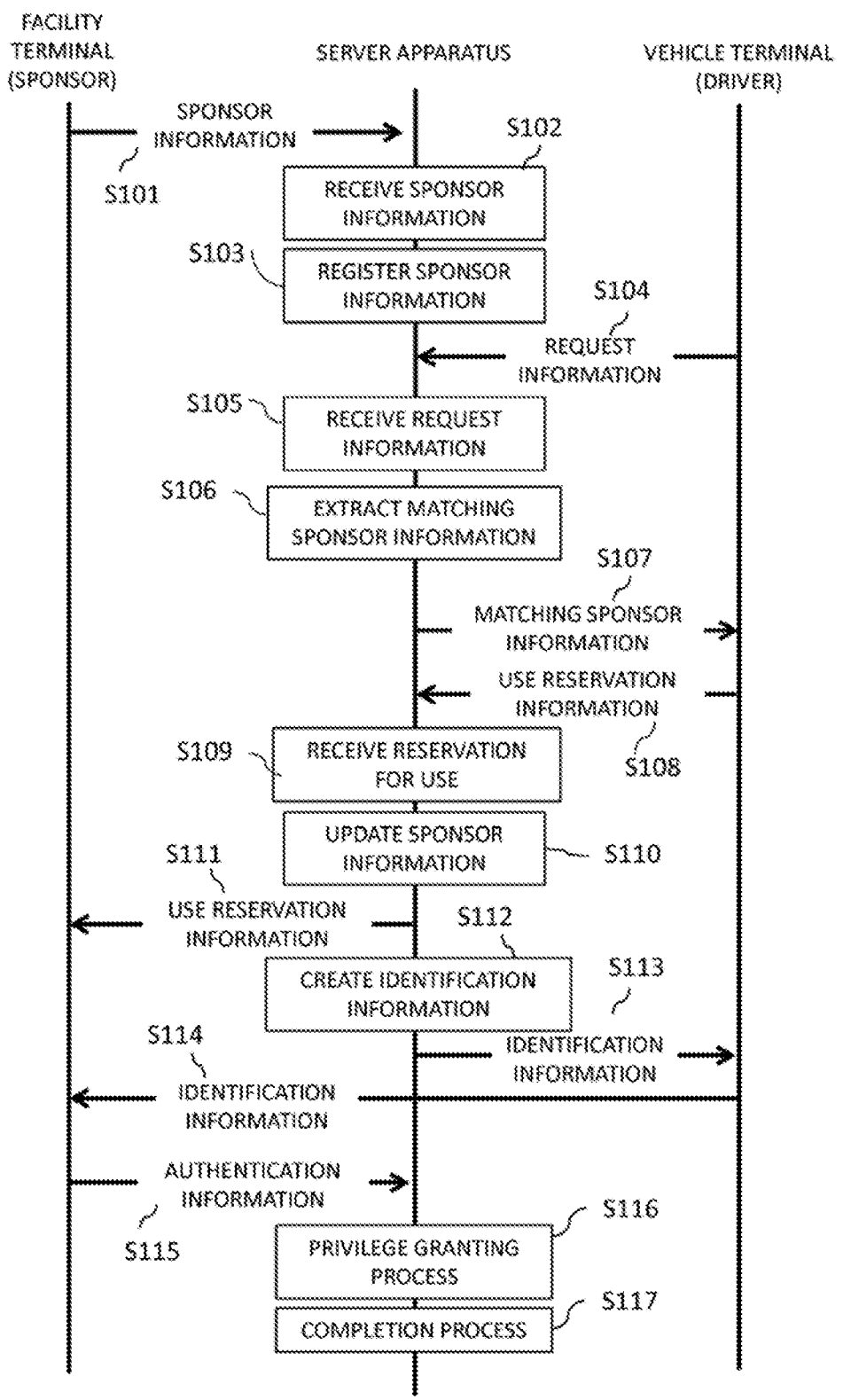
FIG. 4 is a diagram illustrating a data flow in the system according to the first embodiment.

Next, processes executed by the respective aforementioned components will be described. FIG. 4 is a diagram illustrating a data flow in the system according to the present embodiment. Note that a case will be described in the present embodiment where a ride sharing support service is provided via a web site as an example. When the facility terminal 20 or the vehicle terminal 30 accesses the web site, a user interface for the ride sharing support service is displayed on a screen of the facility terminal 20 or the vehicle terminal 30, and the user can acquire and provide information via the user interface. Here, the user is assumed to foe an administrator of the facility using the facility terminal 20 or a person who plans ride sharing such as the driver who uses the vehicle terminal 30.

The administrator of the facility having a space available as the getting-in/off place for ride sharing accesses a site where the facility terminal 20 provides the ride sharing support service on the Internet (hereinafter also referred to as a "ride sharing support site") when providing the space as the getting-in/off place for ride sharing. That is, the facility terminal 20 receives operation according to an input interface provided by the ride sharing support site from the administrator of the facility and transmits sponsor information to the Server apparatus 10 (step S101). Here, the sponsor information includes a sponsor ID, a facility name, a facility location (address), an available time period, the number of vacant parking frames and privilege contents.

The sponsor information acquisition unit 111 of the server apparatus 10 receives the sponsor information from the facility terminal 20 (step S102) and stores the sponsor information in the database of the storage unit 13 in a table format (step S103). The table includes a sponsor ID field, a facility name field, a facility location field, an available time period field, a vacant parking frame field and a privilege contents field, and information of corresponding contents is stored in each field. Note that the processes in step S102 and step S103 include not only the server apparatus 10 acquiring and storing completely new sponsor information but also the server apparatus 10 updating contents of the sponsor Information already stored in the storage unit 13 by acquiring new sponsor information.

On the other hand, the vehicle terminal 30 receives operation from the driver who needs a space available as the getting-in/off place for ride sharing. The vehicle terminal 30 then accesses the ride sharing support site according to the operation from the driver and transmits the request information to the server apparatus 10 (step S104). Here, the request information includes information on a place at which the driver is scheduled to allow a fellow passenger to get in or get off, information on a time at which the driver is scheduled to allow a fellow passenger to get in or get off. The request information may also include information on desired privilege contents. Note that the "place at which the driver is scheduled to allow a fellow passenger to get in or get off" referred to here need not be a definite address but may be a region name or a name of a station of public transportation (bus top name) or the like.

In the server apparatus 10, the request information acquisition unit 112 receives the request information from the vehicle terminal 30 (step S105). The request response unit 113 extracts sponsor information that matches the conditions of the request from the storage unit 13 (step S106), and transmits the sponsor information to the vehicle terminal 30 via the communication unit 12 (step S107). Note that the processes in step S105 to step S107 will be described in detail later.

The vehicle terminal 30 receives an operation of selecting a facility desired by the driver out of the matching sponsor information transmitted (that is, provided) in step S107 from the driver. The vehicle terminal 30 executes a reservation process of using the (parking frame of the) facility as a getting-in/off place for ride sharing. For example, information on the selected facility, information on a use scheduled time and information indicating a desire to use (hereinafter also referred to as "use reservation information") are transmitted from the vehicle terminal 30 to the server apparatus 10 (step S108).

In the server apparatus 10, the use reservation processing unit 114 receives the reservation for use of the facility in step S108 (step S109). The server apparatus 10 then executes a use registration process on the facility, use of which has been reserved. More specifically, the server apparatus 10 first updates the sponsor information of the storage unit 13 so as to decrement by one, the vacant parking frames in a predetermined time zone including the reserved time (step S110). Thus, the parking frame at the ride sharing getting-in/off place, use of which has been reserved is secured on the system. Note that the "predetermined time zone" may be 15 minutes before and after the use scheduled time, 30 minutes from the use scheduled time or the like. Furthermore, the server apparatus 10 transmits use reservation information to the facility terminal 20 of the facility, use of which has been reserved (that is, notifies the sponsor) (step S111). The processes in step S110 and step S111 correspond to the use registration process. Note that the sponsor who has received the notification physically secures a space available as the getting-in/off place for ride sharing in a predetermined time zone including the time period corresponding to the reservation for use.

In the server apparatus 10, the identification information delivery unit 115 creates identification information (step S112) and transmits the identification information to the vehicle terminal 30 via the communication unit 12 (step S113). The identification information is information used for authentication that the parking frame of the facility associated with the reservation for use has actually been used. The identification information may be a password comprised of a number, character string or a combination thereof or a code such as QR code (registered trademark), for example. Alternatively, the identification information may be data not based on visual recognition.

The facility terminal 20 receives an input of the identification information transmitted from the server apparatus 10 in step S113 from the driver who uses the parking frame of the facility associated with the reservation for use as the getting-in/off place for ride sharing (step S114). Thus, the facility terminal 20 authenticates that the facility, use of which has been reserved as the getting-in/off place for ride sharing has actually been used based on the reservation. Note that the method of inputting identification information is not particularly limited, and, for example, the driver may manually input identification information to the facility terminal 20 or may transmit identification information from the vehicle terminal 30 to the facility terminal 20 using wired or wireless communication means for a short-distance target.

When the identification information is inputted in step S114 (that is, the above-described authentication), information indicating that (authentication information) is transmitted from the facility terminal 20 to the server apparatus 10 (step S115). In the server apparatus 10, the authentication information acquisition unit 116 acquires the authentication information.

In the server apparatus 10, the privilege granting management unit 117 performs a process of granting a privilege to the driver based on the authentication information acquired in step S115 and the sponsor information stored in the storage unit 13 (step S116). When, for example, contents of the privilege are payment of money, a bank transfer may be executed to the driver's account registered in advance via other Services for electronic payment.

When a privilege object is handed over from the administrator of the facility to the driver, the server apparatus 10 may indicate a grant of the privilege to the administrator of the facility via the facility terminal 20 as the process of granting the privilege to the driver.

Note that a case of processing has been illustrated in the present embodiment where the ride sharing coordinator is the driver, but when a person other than the driver or the owner of the vehicle assumes the role of coordination for ride sharing, the server apparatus 10 may perform a process of granting a privilege to the person who assumes the role of coordination. On the other hand, when a person other than the driver assumes the role of coordination for ride sharing, the server apparatus 10 may perform a process of granting a privilege to at least one of the person assuming the role of coordination and the driver. For example, the request information may specify information for identifying both the coordinator and the driver (e.g., user ID).

Upon completing privilege granting in step S116, the server apparatus 10 performs a completion process on the matter assuming that the object of the driver and the sponsor associated with the use has been achieved (step S117). Note that the completion process carried out in step S117 is a process corresponding to the reservation for use carried out in step S108 and the completion process does not mean any completion process on the whole service provided by the system. In the present embodiment, the process in step S102 corresponds to the "first step" according to the second aspect of the present invention, and the process in step S107 corresponds to the "second step" according to the second aspect of the present invention.

Request Response Processing

Figure 5:
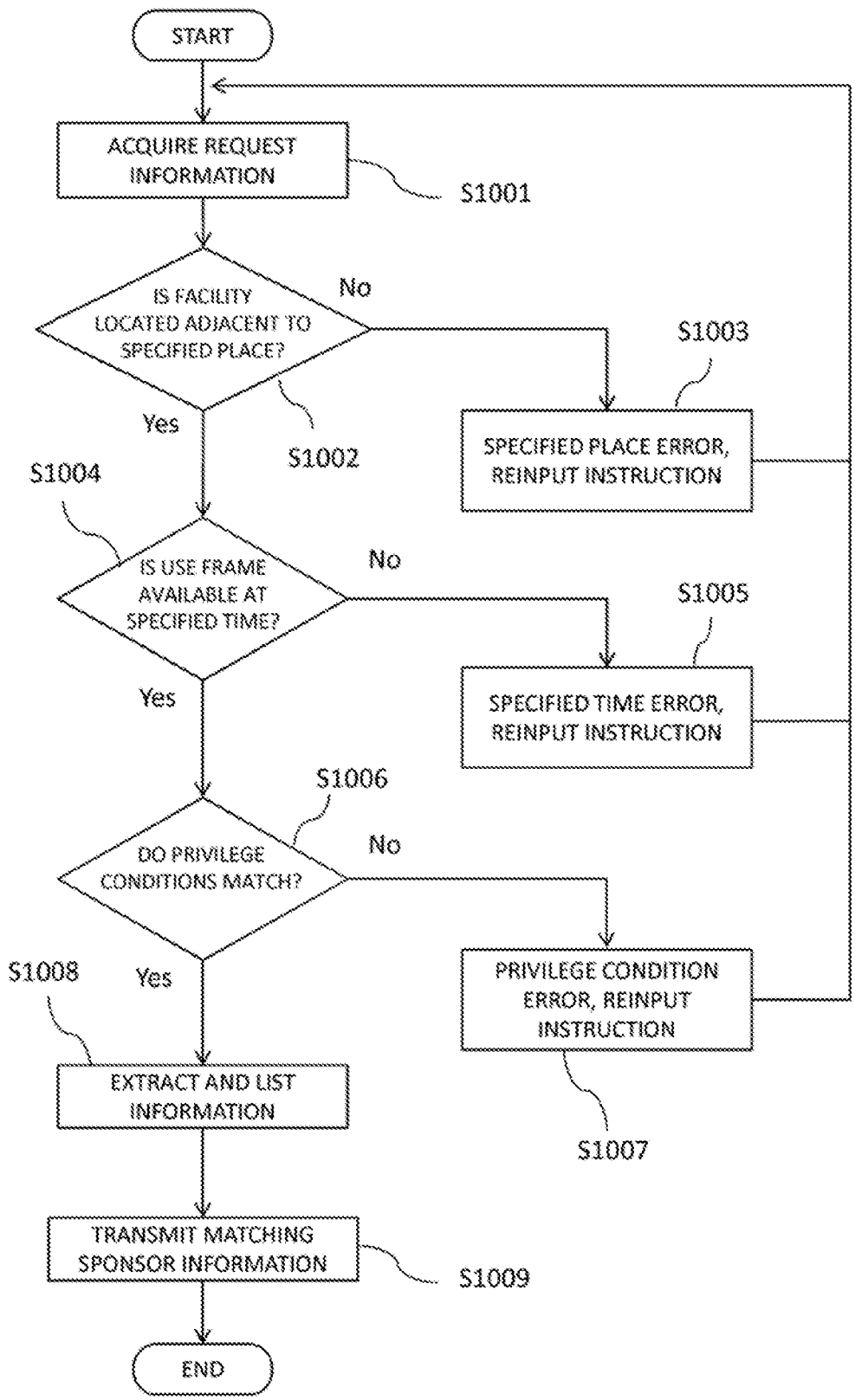
FIG. 5 is a flowchart illustrating a flow of request response processing according to the first embodiment.

Next, the processes in step S105 to step S107, that is, the processes after the server apparatus 10 acquires request information from the vehicle terminal 30 until the server apparatus 10 transmits sponsor information that matches the request information to the vehicle terminal 30 will be described in detail based on FIG. 5. FIG. 5 is a flowchart illustrating an example of a flow of processes after the server apparatus 10 acquires request information until the server apparatus 10 transmits matching sponsor information. Here, the request information includes a request relating to the getting-in/off place and time for ride sharing and a privilege when the facility is used.

Upon acquiring the request information from the driver first (step S1001), the server apparatus 10 refers to the DB of the storage unit 13 and determines whether or not any facility located adjacent to the specified place exists (step S1002). When no such facility located adjacent to the specified place exists, the server apparatus 10 transmits information indicating that there is no matching facility in the specified place and information requesting retransmission of the request information to the vehicle terminal 30 (step S1003).

On the other hand, when the facility located adjacent to the specified place exists in step S1002, the server apparatus 10 determines whether or not there is a vacant parking frame including the specified time in the facility, that is, whether or not the facility is available at the specified time (step S1004). Note that when there are a plurality of corresponding facilities adjacent to the specified place, such determinations are performed on all the facilities.

When there is no vacant parking frame at the specified time in step S1004, the server apparatus 10 transmits information indicating that there is no available facility at the specified time and information requesting retransmission of the request information to the vehicle terminal 30 (step S1005). On the other hand, when there is at least one facility having a vacant parking frame at the specified time, the server apparatus 10 determines whether or not conditions for the privilege included in the sponsor information relating to the facility match the privilege conditions of the request information (step S1006). Note that when there are a plurality of facilities that satisfy conditions of the specified place and specified time, such determinations are performed on all the facilities.

In step S1006, when there is no facility where a privilege that matches the specified privilege conditions is granted, the server apparatus 10 transmits information indicating that there is no facility that matches the specified privilege conditions and information requesting retransmission of the request information to the vehicle terminal 30 (step S1007). On the other hand, when there is at least one facility where a privilege that matches the specified privilege conditions is granted, the server apparatus 10 extracts the sponsor information relating to the facility from the DB. Note that when there are a plurality of facilities where the request information matches the conditions, the server apparatus 10 lists these pieces of information after extraction from the DB in descending order of the matching degree (e.g., in ascending order of distance of the facility location from the specified place) (step S1008). The server apparatus 10 then transmits the extracted and listed sponsor information to the vehicle terminal 30 as the matching sponsor information (step S1009) and ends this routine.

According to the system configuration of the present embodiment, it is possible to easily match a facility having a space available as a getting-in/off place for ride sharing and seeking to attract prospective customers, and a driver who needs a getting-in/off place for ride sharing. Since a getting-in/off place and a scheduled getting-in/off time desired by the driver, and information on a facility conforming to the privilege conditions are extracted and provided to the information to the driver, it is possible for the driver to save time and effort in searching for the facility. Furthermore, a use registration process on the facility is executed by the driver reserving use of a desired facility and specifying a use scheduled time, and it is thereby possible for the driver to reliably secure a getting-in/off place for ride sharing at a desired time. It is authenticated that the facility, use of which has been registered has actually been used as the getting-in/off place for ride sharing and a privilege is granted to the driver based on the authentication, and it is thereby possible to grant a privilege fairly.

Modification 1

Note that in the first embodiment, the server apparatus 10 receives information including the place, time, conditions of privilege contents from the vehicle terminal 30 (that is, the driver) as request information and determines whether or not there is sponsor information that matches all the request information, but such requirements need not always be met. The request information transmitted by the driver may be any one of the place, time and privilege contents or include two of these conditions. Furthermore, the server apparatus 10 may extract and/or list sponsor information that matches some of these conditions and transmit them to the vehicle terminal 30. In this case, a comment indicating that this is not a candidate that completely matches the request information may be attached.

According to such a configuration, it is possible to increase the number of facilities to be extracted and prevent cases in which there is no sponsor information or a very small number of pieces of sponsor information to be provided to the driver. This is effective for a problem that when, for example, the degree of importance of conditions transmitted by the driver as request information is relatively low, the amount of sponsor information to be provided is bound by the conditions and decreased.

Modification 2

In the first embodiment, the processes relating to a reservation for use of the facility (processes in step S108 to step S113) are executed solely once, but the processes may be executed two or more times. That is, even when a reservation for the facility is made once, the reservation may be changed (canceled and a new reservation may be made).

More specifically, in the server apparatus 10, assuming a predetermined time before a getting-in or getting-off time for ride sharing included in the request information acquired in step S105 as a deadline, the use reservation processing unit 114 receives a reservation for use of the facility until the deadline. The predetermined deadline may be set within a range in which the system can operate without any trouble, and the deadline can be set, for example, one hour before the getting-in or getting-off time for ride sharing. The server apparatus 10 which has received a new reservation for use of the facility executes a series of processes (steps S110 to S113) for the new reservation for use of the facility and executes a process of canceling the use registration process which has already been executed. More specifically, the server apparatus 10 updates sponsor information and transmits reservation cancelation information to the facility terminal 20 of the facility, the reservation of which has been canceled.

According to such a configuration, the driver can change a facility to be used as the getting-in/off place for ride sharing any number of times in accordance with privilege contents, convenience of fellow passengers or the like until the predetermined deadline without hesitation about a reservation for use. That is, it is possible to improve the convenience of the system.

Modification 3

In the first embodiment, the processes relating to a reservation for use of a facility (processes in step S108 to step S113) are executed after waiting for use reservation information from the vehicle terminal 30 to be transmitted (that is, based on an application for a reservation for use from the driver), but without being limited to this, the server apparatus 10 may autonomously perform processes relating to a reservation for use of the facility based on predetermined conditions.

The server apparatus 10 according to the present modification acquires in advance, scheduled implementation time information on a getting-in or getting-off time for ride sharing and scheduled implementation region information whereby a getting-in or getting-off region for ride sharing can be specified and stores the information in the storage unit 13. These pieces of information may be information included in the request information or may be information acquired separately. Here, the region specified from the scheduled implementation region information may be a region within a radius of 1 km from a specific point, within the same municipality or the like.

Assuming a predetermined time before the time associated with the scheduled implementation time information as a deadline, the use reservation processing unit 114 extracts, in the case where the use reservation information has not been acquired from the vehicle terminal 30 by the deadline, a facility that matches a predetermined condition from among facilities associated with the acquired sponsor information. The use reservation processing unit 114 further performs a reservation registration process using the extracted facility as the facility where users get in or get-off for ride sharing and transmits authentication information to the vehicle terminal 30 together with information indicating that the reservation registration process has been automatically performed based on a predetermined condition. Note that a facility with a highest privilege value among the aforementioned facilities located within the region may be designated as the facility that matches the predetermined condition.

According to such a configuration, even when the driver has forgotten to apply for a reservation for use, since a facility estimated to be most advantageous for the driver is automatically reserved, it is possible to improve the convenience of the system.

Second Embodiment

System Configuration

Next, a second embodiment of the present system will be described. The present embodiment is different from the first embodiment in that, the control unit 11 of the server apparatus 10 is provided with a privilege content management unit 118 as a functional module, that the sponsor information includes a fellow passenger number condition for privilege granting, and that the authentication information acquisition unit 116 acquires not only authentication on use of a facility but also authentication information on the number of fellow passengers. Note that the "fellow passenger number condition" is a condition about the number of fellow passengers and includes information on the presence or absence of the condition, information on the number of fellow passengers when such a condition exists (e.g., lower limit number of fellow passengers) and a relationship between the number of fellow passengers and contents of a privilege or the like. Hereinafter, components and processes similar to those in the first embodiment are assigned the same reference numerals and detailed description thereof will be omitted.

Figure 6:
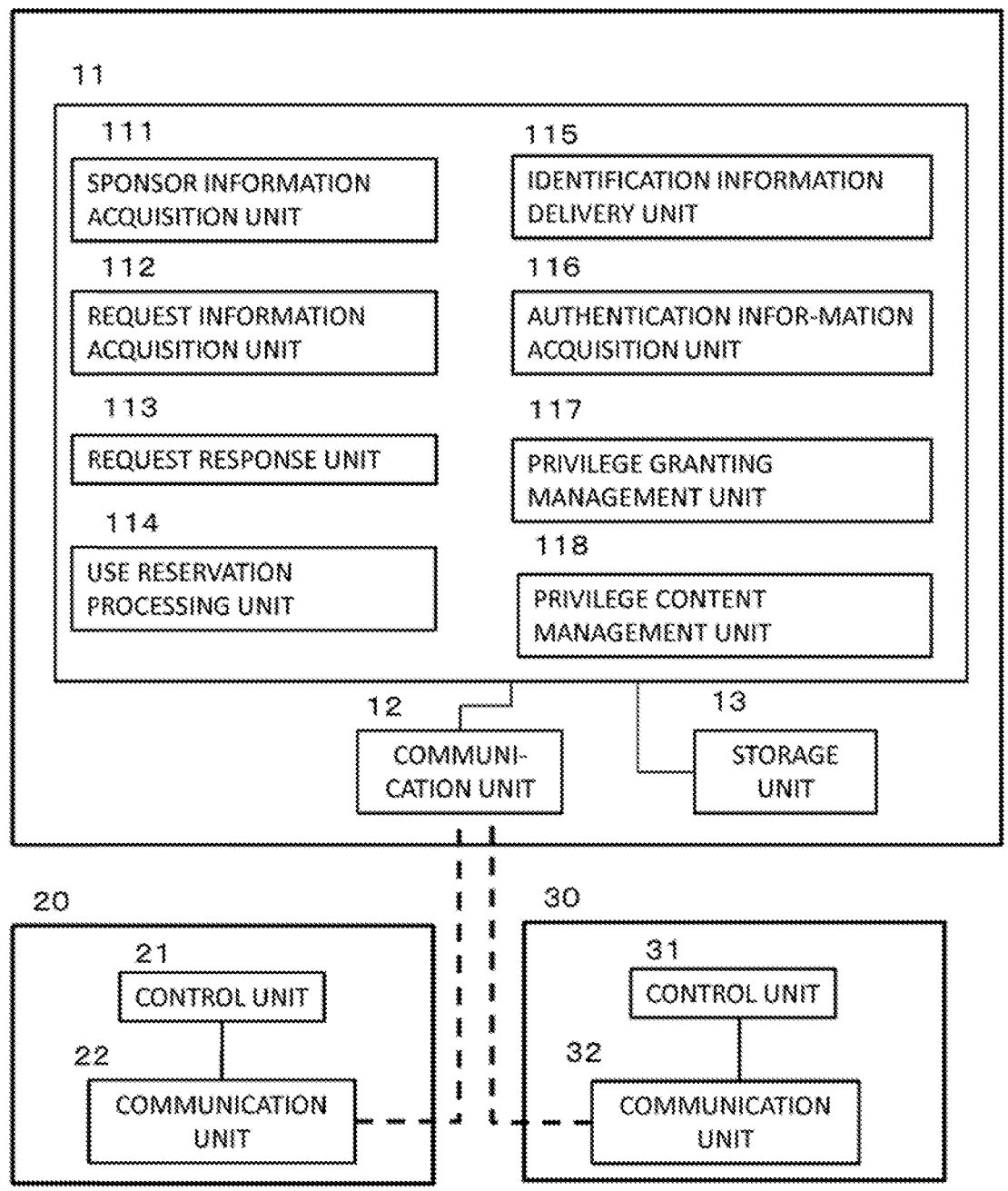
FIG. 6 is a block diagram schematically illustrating a configuration example of a ride sharing support system according to a second embodiment.

FIG. 6 is a block diagram schematically illustrating a configuration example of the server apparatus 10, the facility terminal 20 and the vehicle terminal 30 according to the second embodiment. As illustrated in FIG. 6, the server apparatus 10 is provided with the privilege content management unit 118 as a functional module of the control unit 11 in addition to the configuration of the first embodiment. The privilege content management unit 118 manages contents of a privilege according to a predetermined condition. More specifically, the privilege content management unit 118 changes the privilege contents included in matching sponsor information provided to the driver in accordance with contents of request information acquired by the request information acquisition unit 112. The privilege content management unit 118 also determines the privilege contents to be granted to the driver in accordance with contents of authentication information acquired by the authentication information acquisition unit 116. The privilege content management unit 118 changes the privilege contents according to the number of frames available for the facility stored in the storage unit 13.

According to the present embodiment, the sponsor information transmitted from the facility terminal 20 includes a condition on the number of fellow passengers for privilege granting. FIG. 7 illustrates an example of a table configuration of a DB of the sponsor information stored in the storage unit 13 in the present embodiment. As illustrated in FIG. 7, in the present embodiment, the DB is provided with a fellow passenger number condition field.

According to the present embodiment, the authentication information acquisition unit 116 also acquires, in addition to the authentication information indicating that a facility, use of which has been reserved as a getting-in/off place for ride sharing has actually been used based on the reservation, authentication information on the number of fellow passengers who have actually used (visited) the facility for getting-in/off the vehicle for ride sharing. The privilege granting management unit 117 performs a privilege granting process based on the authentication information on use of the facility and the authentication information on the number of fellow passengers.

Processing Flow

Next, processes carried out by the respective components according to the present embodiment will be described by mainly focusing on differences from the first embodiment. The sponsor information acquisition unit 111 acquires the sponsor condition including the condition on the number of fellow passengers from the facility terminal 20 and stores the condition in the storage unit 13. Here, the condition on the number of fellow passengers will be described as a condition for granting a privilege when a facility space is used as the getting-in/off place for ride sharing; however, the condition on the number of fellow passengers may be a condition as to whether or not a facility space can be used as the getting-in/off place for ride sharing.

Request Response Process

Figure 8:
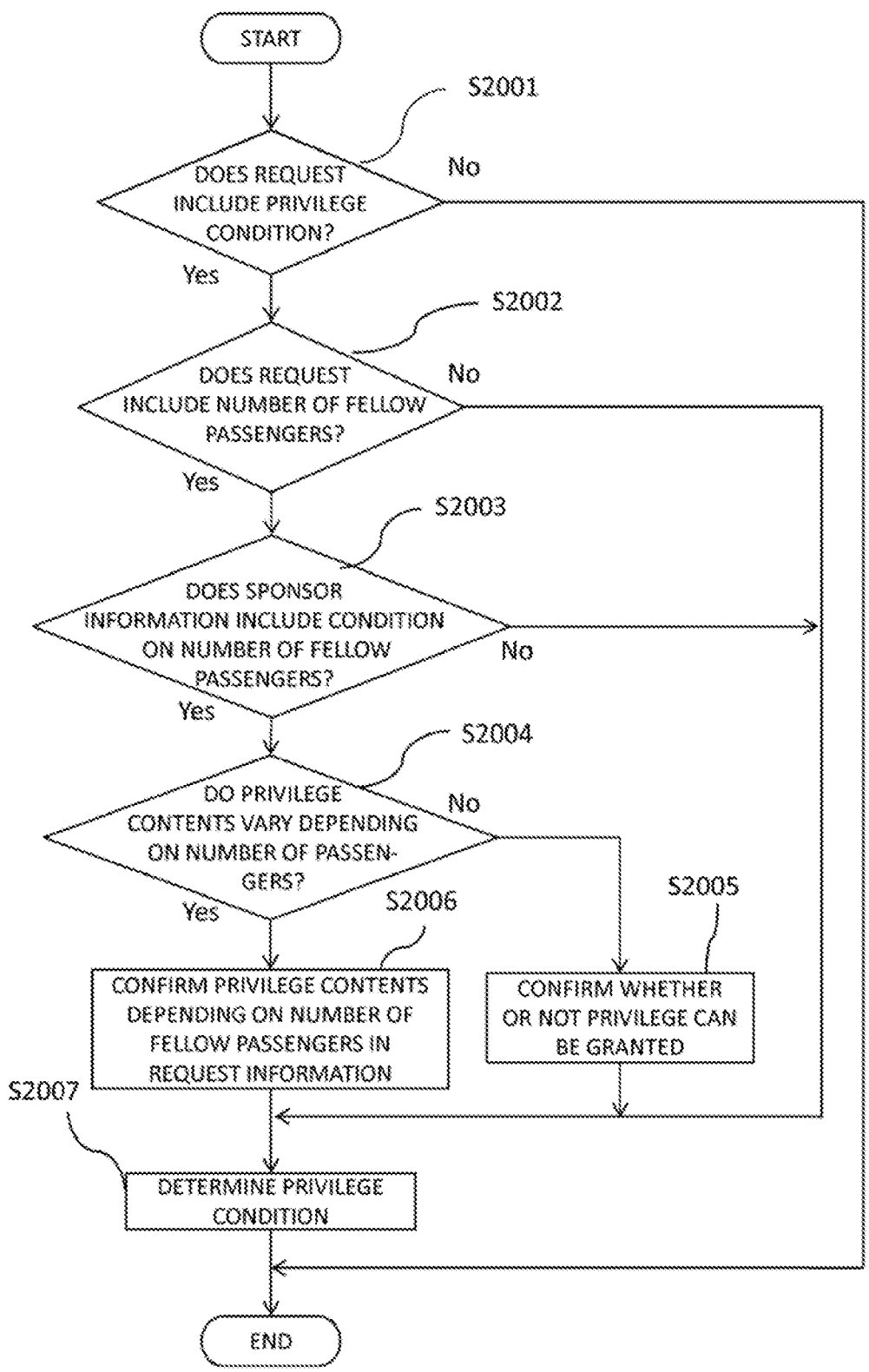
FIG. 8 is a flowchart illustrating a flow of processing relating to determination processing on conditions of privilege contents of a flow of request response processing according to the first embodiment.

Hereinafter, a request response process in the present embodiment will be described. Since the request, response process in the present embodiment is different from the request response process in the first embodiment solely in the part corresponding to step S1006, the different part alone will be described and description of the rest of the processing flow will be omitted. FIG. 8 is a flowchart illustrating a processing flow executed before a determination process on conditions of privilege contents out of the request response process in the present, embodiment.

The server apparatus 10 first performs a determination process on conditions about a place and time in a flow similar to that in step S1001 to step S1005 of the first embodiment. Next, the server apparatus 10 determines whether or not the request information includes a condition of privilege contents (step S2001), and ends the process when no condition of privilege is included, assuming that the privilege condition is matched. On the other hand, when the request condition includes the condition of privilege contents, the server apparatus 10 determines whether or not the request information includes information on the number of fellow passengers (step S2002). When it is determined in step S2002 that the request information does not include the number of fellow passengers, the server apparatus 10 proceeds to a process of determining whether or not there is a facility that matches contents of the privilege specified by the request information (step S2007, corresponding to step S1006 in the first embodiment and the same will apply hereinafter). On the other hand, when the request information includes the number of fellow passengers in step S2002, the server apparatus 10 determines whether or not the sponsor information includes the condition on the number of fellow passengers (step S2003).

When there is no condition on the number of fellow passengers in the sponsor information in step S2003, the server apparatus 10 proceeds to a process of determining whether or not there is a facility that matches the contents of the privilege specified by the request information (step S2007). On the other hand, when there is at least one facility, the sponsor information of which includes the condition on the number of fellow passengers, the server apparatus 10 determines whether or not the condition is such that the privilege contents vary depending on the number of passengers, that is, whether or not the condition, is a condition simply on whether or not privilege granting is possible (step S2004). When it is determined in step S2004 that the condition on the number of fellow passengers is a condition simply on whether or not privilege granting is possible, the server apparatus 10 performs a process of determining whether or not the number of fellow passengers of the request information satisfies the condition on the number of fellow passengers of the sponsor information and confirming whether or not the privilege is granted (step S2005). The server apparatus 10 then proceeds to a process of determining whether or not there is a facility that matches the contents of the privilege specified by the request information based on the result in step S2005 (step S2007).

On the other hand, regarding the condition on the number of fellow passengers, when there is at least one facility where contents of the privilege vary depending on the number of passengers in step S2004, the privilege content management unit 218 in the server apparatus 10 performs a process of calculating contents of the privilege according to the number of fellow passengers of the request information (step S2006). The server apparatus 10 then proceeds to a process of determining whether or not there is a facility that matches the contents of the privilege specified by the request information based on the calculated contents of the privilege (step S2007).

Authentication Information

Note that according to the present embodiment, when a facility associated with a reservation for use is used as the getting-in/off place for ride sharing, the facility terminal 20 performs not only authentication that the facility has actually been used but also authentication on the number of fellow passengers for ride sharing. The authentication information acquired by the authentication information acquisition unit 116 in the server apparatus 10 also includes authentication information on the number of fellow passengers. The method for authentication is not particularly limited, and the administrator (or staff instructed by the administrator) of the facility may confirm the authentication information and input the authentication information to the facility terminal 20. Furthermore, a camera and an image analysis system may be caused to cooperate with the facility terminal 20 so that an image of a parking space is taken by the camera and the image is analyzed to obtain information on the number of fellow passengers.

In the server apparatus 10, the privilege content management unit 118 confirms contents of the privilege based on the authentication information on the number of fellow passengers and the privilege granting management unit 117 performs a process on privilege granting.

According to the above-described configuration of the present embodiment, it is possible for the sponsor to define a lower limit of the number of fellow passengers necessary for the privilege granting or change the contents of the privilege depending on the actual number of fellow passengers for ride sharing. In this way, it is possible to avoid cases where fewer people (that is, prospective customers for the sponsor) visit the facility than expected and it is impossible to keep balance with the privilege granting, causing the sponsor to suffer a loss.

Modification

Note that a case has been described in the present embodiment as an example of a change in the privilege contents managed by the privilege content management unit 118 where the number of fellow passengers for ride sharing is associated with the privilege contents, but it does not matter if the privilege contents change in association with other elements. For example, a vacant parking frame in a facility may be caused to be associated with the privilege contents. The value of a privilege may be increased when there are more vacant parking frames (that is, the degree of congestion is small) and the value of the privilege may be decreased when there are fewer vacant parking frames (that is, the degree of congestion is large). For example, when the privilege contents are payment of money, the value of the privilege may be the sum obtained by multiplying the number of parking frames at the time of making a reservation for use by a unit price or a bonus corresponding to the number of vacant parking frames may be added. Note that conditions of such privilege changes may be stored in the storage unit 13 as contents of the sponsor information. According to such a configuration, the administrator of the facility can timely change the privilege contents according to the number of vacant parking frames, and thereby efficiently adjust the degree of attraction for ride sharing users as appropriate.

Third Embodiment

System Configuration

Figure 9:
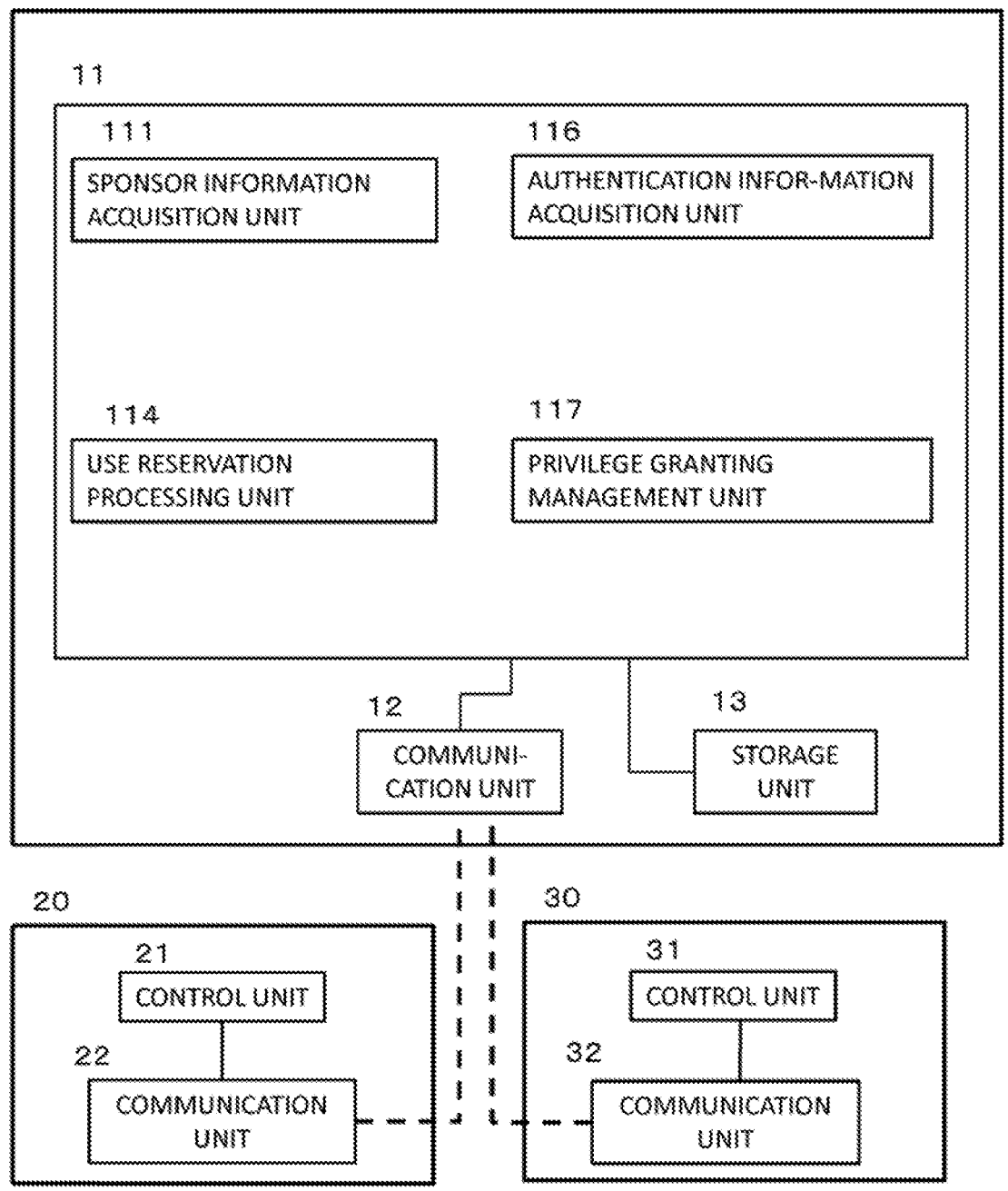
FIG. 9 is a block diagram schematically illustrating a configuration example of a ride sharing support system according to a third embodiment.

Next, a third embodiment of the present system will be described. Compared to the configuration of the first embodiment, the present embodiment has a simpler configuration. Components and processes in the present embodiment similar to those of the first embodiment are assigned the same reference numerals and detailed description thereof will be omitted. FIG. 9 is a block diagram schematically illustrating a configuration example of the server apparatus 10, the facility terminal 20 and the vehicle terminal 30 according to the present embodiment. As illustrated in FIG. 9, compared with the configuration of the first embodiment, the server apparatus 10 of the present embodiment has a configuration without including the request, information acquisition unit 112, the request response unit 113 and the identification information delivery unit 115 as functional modules of the control unit 11.

Processing Flow

Figure 10:
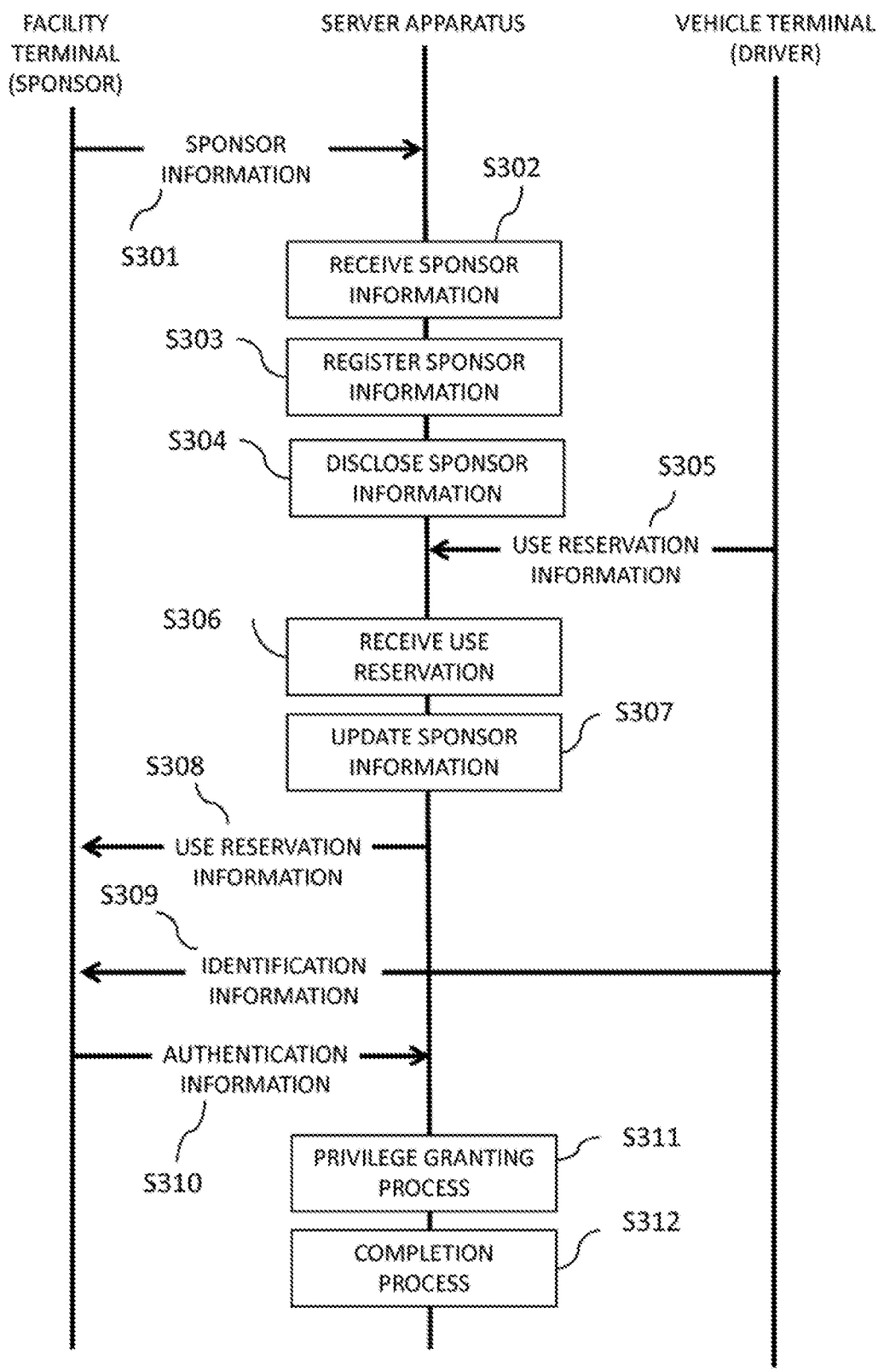
FIG. 10 is a diagram illustrating a data flow of the system according to the third embodiment.

Next, a processing flow in the present embodiment will be described based on FIG. 10. FIG. 10 is a diagram illustrating a data flow in the present embodiment. Processes from acquisition of sponsor information to registration of the sponsor information (step S301 to step S303) are similar to those in the first embodiment. In the present embodiment, the server apparatus 10 discloses data which is left stored in the storage unit 13 on a ride sharing support site as a list (step S304). That is, the sponsor information is provided to the user of the site including the driver for ride sharing. More specifically, when the ride sharing support site is accessed, a list of sponsor information can be browsed. This allows the driver to select a facility the driver wants to use from the list.

The vehicle terminal 30 receives the driver's input of the facility the driver wants to use and transmits use reservation information of the facility to the server apparatus 10 (step S305).

Note that according to the present embodiment, the use reservation information acquired by the server apparatus 10 includes identification information for authentication. That is, according to the present embodiment, since no identification information is delivered from the server apparatus 10, the driver himself/herself sets identification information for collating a person who has made a reservation for use and a person who has actually used the facility to get authenticated for having used the facility. The identification information can be anything if it can collate the reserver and the user, and can be, for example, a password arbitrarily set by the driver or a registration number (number of a number plate) of the vehicle used for ride sharing. The vehicle terminal 30 receives the inputs of these pieces of information and transmits the information included in the use reservation information to the server apparatus 10.

The server apparatus 10 receives the reservation for use from the driver, updates the sponsor information in the storage unit 13 and transmits the use reservation information including identification information to the facility terminal 20 (step S306 to step S308). Note that the processes in step S306 to step S308 are similar to the processes of the first embodiment.

The facility terminal 20 receives an input of identification information transmitted from the server apparatus 10 in step S308 from the driver who has used a parking frame of the facility associated with a reservation for use as the getting-in/off place for ride sharing (step S309). For example, when the identification information is a password, the facility terminal 20 receives an input of the password from the driver. On the other hand, when the identification information is a registration number of the vehicle, the administrator of the facility (or staff who receives an instruction from the administrator) may confirm the registration number and input it to the facility terminal 20. Furthermore, a camera and an image analysis system may be caused to cooperate with the facility terminal 20 so that an image of a parking space is taken by the camera and the image is analyzed to obtain the registration number. Thus, the facility terminal 20 authenticates that the facility, use of which has been reserved as the getting-in/off place for ride sharing has actually been used based on the reservation.

Processes after step S309 are similar to those of the first embodiment. The server apparatus 10 acquires authentication information from the facility terminal 20 (step S310), performs a process of privilege granting based on the authentication information (step S311) and performs a completion process on the matter (step S312). Note that in the present embodiment, the process in step S302 corresponds to the "first step" according to the second aspect of the present invention and the process in step S304 corresponds to the "second step" according to the second aspect of the present invention.

The above-described configuration of the present embodiment makes it possible to construct a system in a simple configuration that motivates the driver to provide ride sharing and enhances the driver's motivation.

Others

Note that the above-described respective embodiments simply illustrate the present invention, but the present invention is not limited to the above-described specific aspects.

For example, in the above respective embodiments, although the driver of the vehicle implementing ride sharing is a "ride sharing coordinator," the ride sharing coordinator is not limited to the driver and the coordinator may be a person who does not drive himself/herself but play the role of looking for other fellow passengers or a person who does not actually ride in the vehicle implementing ride sharing but may mediate between the driver and ride-share candidates.

In the above respective embodiments, although authentication information is transmitted from the facility terminal 20 to the server apparatus 10, for example, the vehicle terminal 30 may acquire authentication information and the vehicle terminal 30 may transmit the authentication information to the server apparatus 10.

In the above respective embodiments, although the ride sharing support system 1 is provided on an Internet site, without being limited to this, a configuration may be adopted in which the facility terminal 20 and the vehicle terminal 30 may install a predetermined application to make the system available. Instead of installing an application in the terminal, the predetermined application may be provided through a so-called. ASP (Application Service Provider).

Furthermore, the server apparatus 10 in the above respective embodiments may be an element constituting not only the ride sharing support system 1 but also other systems. For example, the server apparatus 10 may constitute a management system that manages operation of ride sharing and construct a mechanism in which the system and the ride sharing support system 1 operate in cooperation. More specifically, information on the facility associated with the reservation for use and information on the getting-in or getting-off time received in step S109 in the first embodiment may be reflected in the management system as the getting-in place or getting-off place for ride sharing and the getting-in or getting-off time for ride sharing respectively. It is thereby possible to integrally provide the system that manages operation of ride sharing and the ride sharing support system, and thereby enhance convenience of the driver.

When the ride sharing support system and the ride sharing operation management system are integrally provided, the server apparatus 10 may automatically determine a facility to be a getting-in or getting-off place for ride sharing according to predetermined conditions without the need to acquire facility use reservation information. More specifically, assuming a predetermined time (e.g., one hour before) before a ride sharing start time registered in advance in the ride sharing operation management system as a deadline, the server apparatus 10 may execute a use registration process on a facility with a highest privilege value when the server apparatus 10 has been unable to acquire use reservation information of any facility by the deadline. The target facility in this case may be selected from among facilities located in a region (e.g., within a radius of 1 km from a specific point) assuming a place identified from the information on the getting-in or getting-off place for ride sharing registered in advance in the ride sharing operation management system as a starting point.

The processes and means described in the present disclosure may be freely implemented in combination so far as to be technically consistent. A process described as being executed by one apparatus may be shared and executed by a plurality of apparatuses. Alternatively, processes described as being executed by different apparatuses may be executed by one apparatus. In the computer system, in what hardware configuration (server configuration) each function is implemented can be flexibly changed.

The present invention can also be implemented by supplying a computer program provided with the functions described in the above embodiments to a computer and by one or more processors provided in the computer reading and executing the program. Such a computer program may be provided to the computer by a non-transitory computer readable storage medium connectable to a system bus of the computer or provided to the computer via a network.

Examples of the non-transitory computer readable storage medium include a magnetic disk (floppy (registered trademark)) disk, a hard disk drive (HDD)), an arbitrary type disk such as optical disk (CD-ROM, DVD disk, blue-ray disk), a read only memory (ROM), a random access memory (RAM), an EPROM, an EEPROM, a magnetic card, a flash memory, an optical card, an arbitrary type medium suitable for storing electronic instructions.

What is claimed is:

1. An information processing apparatus comprising a controller configured to:
acquire sponsor information including information on a facility available as a getting-in place or getting-off place for ride sharing, information on a time period during which the facility is available as the getting-in place or getting-off place for ride sharing, and information on a privilege when the facility is used as the getting-in place or getting-off place for ride sharing;
acquire request information including information on a getting-in or getting-off place for ride sharing and information on a getting-in or getting-off time for ride sharing;
determine an available facility, as the getting-in or getting-off place, based on the request information and the sponsor information;
transmit the acquired sponsor information to a vehicle-mounted information terminal or a portable information terminal associated with a ride sharing coordinator, based on a result of the determination;
acquire use reservation information of the facility associated with the acquired sponsor information;
perform a use registration process for the facility associated with the use reservation information, after acquiring the use reservation information;
acquire the use reservation information until a predetermined time before the getting-in or getting-off time for ride sharing indicated in the request information;
acquire region information that identifies a getting-in or getting-off region for ride sharing; and
acquire the use reservation information by extracting, when it is not possible to acquire the use reservation information by the predetermined time before the getting-in or getting-off time for ride sharing, a facility located within a region identified by the region information and having a highest privilege value from among facilities associated with the acquired sponsor information.

2. The information processing apparatus according to claim 1, wherein
the sponsor information provided to the coordinator for ride sharing matches the request information.

3. The information processing apparatus according to claim 1, wherein the use reservation information includes information for identifying the facility to be used as the getting-in place or getting-off place for ride sharing and information for identifying the getting-in or getting-off time for ride sharing.

4. The information processing apparatus according to claim 3, wherein the use registration process comprises registering, in a management system that manages operation of ride sharing,
the facility associated with the information identifying the facility to be used as the getting-in place or getting-off place for ride sharing as the getting-in place or getting-off place for ride sharing, and
the time associated with the information identifying the getting-in or getting-off time for ride sharing as the getting-in or getting-off time for ride sharing.

5. The information processing apparatus according to claim 1, wherein the controller is further configured to acquire authentication information including authentication that the facility associated with the sponsor information subjected to the use registration process is used as the getting-in place or getting-off place for ride sharing.

6. The information processing apparatus according to claim 5, wherein the authentication information includes authentication about the number of fellow passengers using ride sharing.

7. The information processing apparatus according to claim 5, wherein
the controller is further configured to:
confirm contents of the privilege based on the authentication information; and
perform a process of granting the privilege with the confirmed contents to at least one of a ride sharing driver and the ride sharing coordinator.

8. The information processing apparatus according to claim 1, wherein the sponsor information includes information on a lower limit of the number of fellow passengers as a condition for granting the privilege.

9. The information processing apparatus according to claim 1, wherein contents of the privilege vary depending on the number of fellow passengers using ride sharing.

10. The information processing apparatus according to claim 1, wherein the sponsor information includes the number of vacant parking frames available as the getting-in place or getting-off place for ride sharing, and
contents of the privilege vary depending on the number of vacant parking frames.

11. An information processing method comprising:
acquiring sponsor information including information on a facility available as a getting-in place or getting-off place for ride sharing, information on a time period during which the facility is available as the getting-in place or getting-off place for ride sharing and information on a privilege when the facility is used as the getting-in place or getting-off place for ride sharing;
acquiring request information including information on a getting-in or getting-off place for ride sharing and information on a getting-in or getting-off time for ride sharing;
determining an available facility, as the getting-in or getting-off place, based on the request information and the sponsor information;
transmitting the sponsor information acquired in the acquiring step to a vehicle-mounted information terminal or a portable information terminal associated with a ride sharing coordinator, based on a result of the determining;
acquiring use reservation information of the facility associated with the acquired sponsor information;
performing a use registration process for the facility associated with the use reservation information, after acquiring the use reservation information;
acquiring the use reservation information until a predetermined time before the getting-in or getting-off time for ride sharing indicated in the request information;
acquiring region information that identifies a getting-in or getting-off region for ride sharing; and
acquiring the use reservation information by extracting, when it is not possible to acquire the use reservation information by the predetermined time before the getting-in or getting-off time for ride sharing, a facility located within a region identified by the region information and having a highest privilege value from among facilities associated with the acquired sponsor information.

12. A non-transitory computer readable storing medium recording a computer program for causing a computer to perform a method comprising:

acquiring sponsor information including information on a facility available as a getting-in place or getting-off place for ride sharing, information on a time period during which the facility is available as the getting-in place or getting-off place for ride sharing and information on a privilege when the facility is used as the getting-in place or getting-off place for ride sharing;

acquiring request information including information on a getting-in or getting-off place for ride sharing and information on a getting-in or getting-off time for ride sharing;

determining an available facility, as the getting-in or getting-off place, based on the request information and the sponsor information;

transmitting the sponsor information acquired in the acquiring step to a vehicle-mounted information terminal or a portable information terminal associated with a ride sharing coordinator, based on a result of the determining;

acquiring use reservation information of the facility associated with the acquired sponsor information;

performing a use registration process for the facility associated with the use reservation information, after acquiring the use reservation information;

acquiring the use reservation information until a predetermined time before the getting-in or getting-off time for ride sharing indicated in the request information;

acquiring region information that identifies a getting-in or getting-off region for ride sharing; and acquiring the use reservation information by extracting, when it is not possible to acquire the use reservation information by the predetermined time before the getting-in or getting-off time for ride sharing, a facility located within a region identified by the region information and having a highest privilege value from among facilities associated with the acquired sponsor information.

* * * * *